US008814276B2

(12) United States Patent
Brown et al.

(10) Patent No.: US 8,814,276 B2
(45) Date of Patent: Aug. 26, 2014

(54) SYSTEM AND METHOD FOR A WHEEL LOCK RING ASSEMBLY

(75) Inventors: Rick Brown, Dayton, OH (US); Robert Phillis, Covington, OH (US); Scott Whittle, Springboro, OH (US)

(73) Assignee: Goodrich Corporation, Charlotte, NC (US)

( * ) Notice: Subject to any disclaimer, the term of this patent is extended or adjusted under 35 U.S.C. 154(b) by 458 days.

(21) Appl. No.: 13/157,987

(22) Filed: Jun. 10, 2011

(65) Prior Publication Data
US 2012/0313423 A1    Dec. 13, 2012

(51) Int. Cl.
*B60B 25/14*    (2006.01)
(52) U.S. Cl.
USPC .......... 301/35.3; 301/23; 301/35.51; 152/409
(58) Field of Classification Search
CPC ........ B60B 25/04; B60B 25/08; B60B 25/14; B60B 25/18; B60B 25/22
USPC ............... 301/11.1, 23, 35.3, 35.51; 152/396, 152/401, 406, 409, 410, 411, DIG. 10; 244/103 R
See application file for complete search history.

(56) References Cited

U.S. PATENT DOCUMENTS

| | | | |
|---|---|---|---|
| 1,710,614 A | 4/1929 | Furrer | |
| 2,894,556 A * | 7/1959 | Darrow | 152/410 |
| 3,106,237 A | 10/1963 | Holmes, Jr. | |
| 3,224,484 A | 12/1965 | Smith | |
| 3,599,697 A | 8/1971 | Gerbeth | |
| 3,783,927 A | 1/1974 | Verdier | |
| 4,369,826 A * | 1/1983 | Hendrickson | 152/410 |
| 4,401,144 A * | 8/1983 | Wilde | 152/158 |
| 4,407,348 A * | 10/1983 | Suckow | 152/410 |
| 4,438,797 A * | 3/1984 | Suckow | 152/410 |
| 4,721,142 A * | 1/1988 | Foster | 152/410 |
| 4,911,216 A | 3/1990 | Yamoto et al. | |
| 5,086,821 A | 2/1992 | Russell et al. | |
| 5,259,430 A * | 11/1993 | Smith et al. | 152/410 |
| 5,984,421 A | 11/1999 | Proctor | |
| 7,625,030 B2 * | 12/2009 | Bieker et al. | 295/7 |
| 7,819,154 B2 * | 10/2010 | Durif | 152/409 |
| 2008/0251639 A1 | 10/2008 | Kipp et al. | |

FOREIGN PATENT DOCUMENTS

| | | |
|---|---|---|
| GB | 2154957 | 3/1984 |
| SU | 962032 | 9/1982 |
| WO | 2006106053 | 10/2006 |

OTHER PUBLICATIONS

Search and Examination Report dated Jun. 20, 2012 in Application No. GB1203152.2.

* cited by examiner

*Primary Examiner* — Kip T Kotter
*Assistant Examiner* — Jean Charleston
(74) *Attorney, Agent, or Firm* — Snell & Wilmer L.L.P.

(57) ABSTRACT

Systems and methods disclosed herein may be useful for use in a lock ring assembly. In this regard, a lock ring assembly is provided comprising a wheel base having a side rim disposed about a circumference of the wheel base, an ID lock ring and an OD lock ring disposed within a gap between the wheel base and the side rim. The ID lock ring has two surface contacts with the wheel base and one surface contact with the side rim. The OD lock ring has two surface contacts with the side rim and one surface contact with the wheel base. In various embodiments, the ID lock ring and the OD lock ring are in contact.

7 Claims, 22 Drawing Sheets

SYSTEM AND METHOD FOR A WHEEL LOCK RING ASSEMBLY

FIELD

The present disclosure is related to a lock ring assembly for use in, for example, an aircraft wheel.

BACKGROUND

Aircraft wheels often comprise a wheel base, a side rim, and a single lock ring. The wheel base is typically coupled to the aircraft brake for applying torque to cause the aircraft to decelerate. The side rim is typically coupled about a circumference of the wheel base and is often at least partially in contact with a tire. A single lock ring is typically placed in between the wheel base and the side rim for transferring torque from the wheel base to the side rim. However, in applications having large wheel bases (e.g., 19 inches in diameter or greater), a wheel having a single lock ring may be prone to a wheel-skid. A wheel-skid is an event in which the tire and side rim continue to roll at ground speed while the wheel base is locked to the brake and not rotating. A wheel-skid is in contrast to a tire-skid, where the tire is stationary, and sliding, relative to the runway. Thus, it may be desirable to produce a lock ring assembly that tends to resist a wheel-skid.

SUMMARY

Systems and methods disclosed herein may be useful for use in a lock ring assembly. In this regard, a lock ring assembly is provided comprising a wheel base having a side rim disposed about a circumference of the wheel base, an inner diameter (ID) lock ring and an outer diameter (OD) lock ring disposed within a gap between the wheel base and the side rim. The ID lock ring has two surface contacts with the wheel base and one surface contact with the side rim. The OD lock ring has two surface contacts with the side rim and one surface contact with the wheel base. In various embodiments, the ID lock ring and the OD lock ring are in contact.

In further embodiments, a lock ring assembly is provided comprising a wheel base having a side rim disposed about a circumference of the wheel base, an ID lock ring and an OD lock ring disposed within a gap between the wheel base and the side rim. A surface of the ID lock ring is in contact with a surface of the OD lock ring.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for lock ring assemblies. Although the embodiments herein are described with reference to lock ring assemblies used in connection with aircraft wheels, such embodiments are provided for example only as it is contemplated that the disclosures herein have applicability to other vehicles, such as for example, automobiles.

As described above, a lock ring assembly may transfer torque from a wheel base to a side rim. A wheel base and side rim together (whether with a lock ring assembly or without) may be referred to as a wheel assembly. In various embodiments, a lock ring assembly may comprise any number of lock rings, although in various embodiments a lock ring assembly comprises two lock rings. Lock rings in a lock ring assembly may be referred to as a first lock ring, second lock ring, third lock ring, and so forth. A lock ring assembly may have an axis. The lock ring of a lock ring assembly that is closest to the center of the wheel base may be referred to as an inner lock ring (an "ID lock ring"). The lock ring of a lock ring assembly that is furthest from the center of the wheel base (e.g., the outboard lock ring) may be referred to as an outer lock ring (an "OD lock ring").

Figure 1:
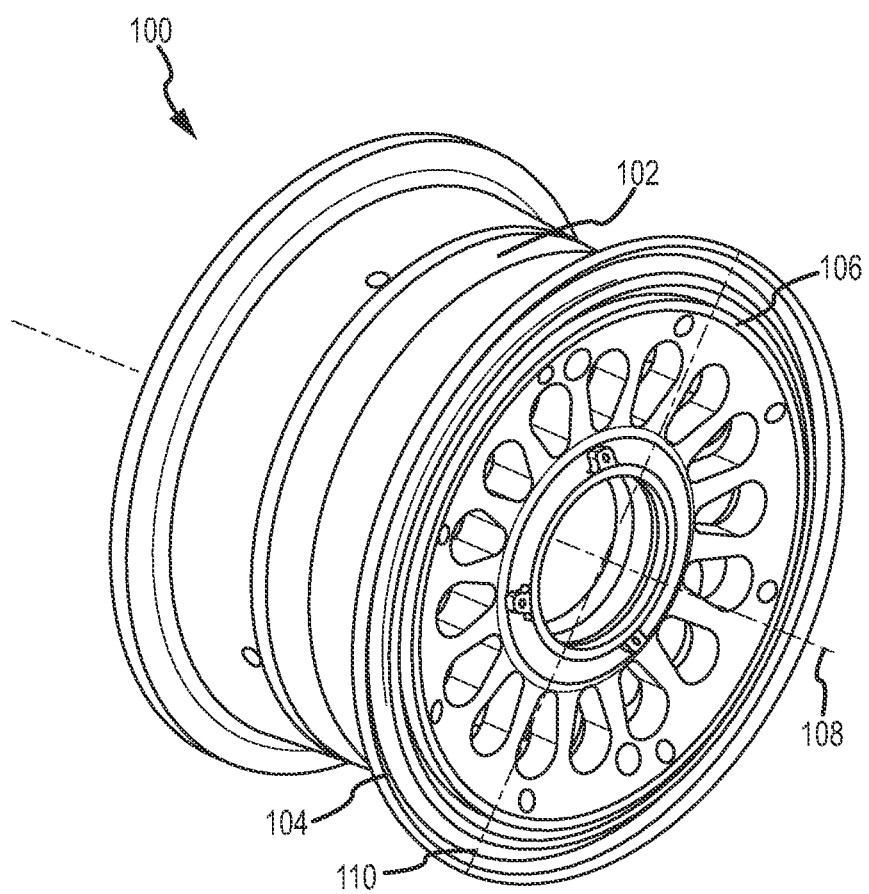
FIG. 1 illustrates a wheel assembly in accordance with various embodiments.

With reference to FIG. 1, wheel assembly 100 is shown. Wheel assembly 100 comprises side rim 104 and wheel base 102. Side rim 104 is disposed coaxially to wheel base 102. In wheel assembly 100, side rim 104 and wheel base 102 both share axis 108. Radius 110 extends across the diameter of both side rim 104 and wheel base 102. OD lock ring 106 is also visible.

It is believed that wheel skids may occur where high torque change rates and/or high torque magnitudes are used. Stated another way, when the rate of torque application changes rapidly and/or when high torque magnitudes are used, a wheel skid tends to be more likely. Improving the torque capacity of a lock ring assembly may thus allow the lock ring assembly to more safely transfer torque under a high rate of change of torque application rate.

While not intending to be bound by theory, lock ring assemblies having more than one lock ring may resist wheel skids because they provide multiple torque paths between a wheel base and a side rim. Stated another way, having more than one torque path may reduce the tendency of a wheel assembly to encounter a wheel skid. Moreover, while not intending to be bound by theory, lock ring assemblies having more than one lock ring may resist wheel skids due to the dampening effect provided by the interface of at least two of the lock rings of a lock ring assembly. Stated another way, allowing the interface of at least two of the lock rings of a lock ring assembly to slip during torque application may prevent or reduce wheel skids.

Figure 2:
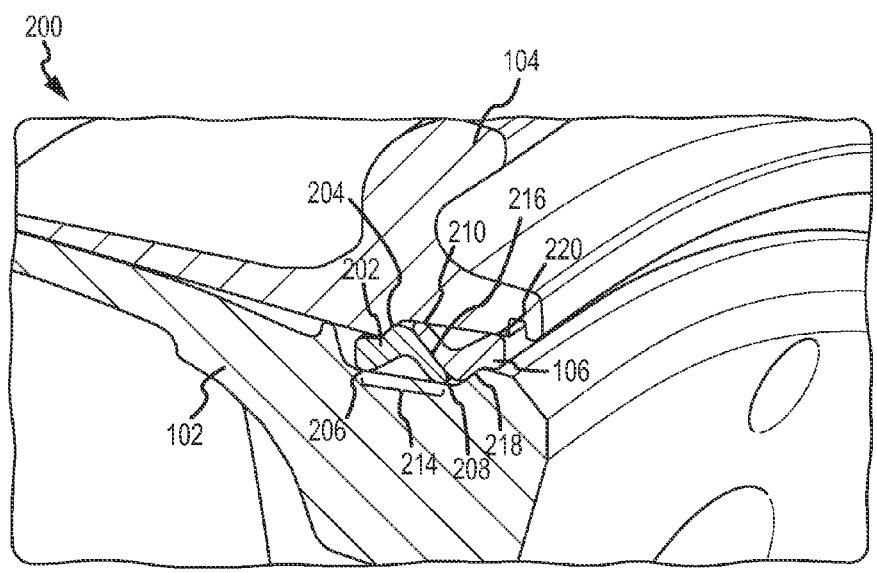
FIG. 2 illustrates a cross section of a wheel assembly, in accordance with various embodiments.

With reference to FIG. 2, wheel assembly 200 is shown. Wheel base 102 and side rim 104 are shown in cross section. A space or gap exists between wheel base 102 and side rim 104. Inside this gap is lock ring assembly 214 that comprises OD lock ring 106 and ID lock ring 202.

Figure 3:
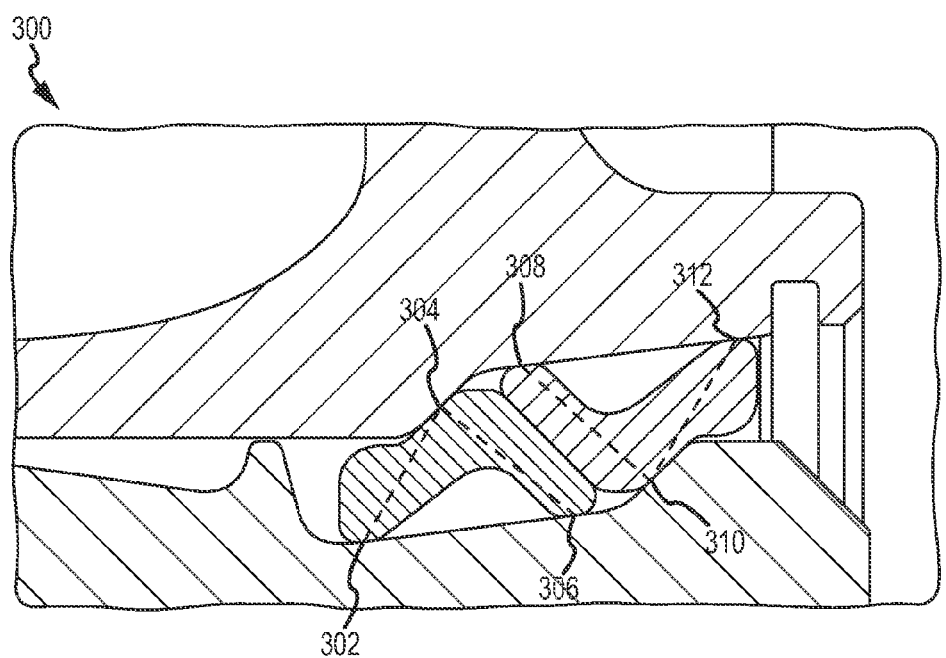
FIG. 3 illustrates a different view of the cross section of the wheel assembly of FIG. 2, in accordance with various embodiments.
Figure 4:
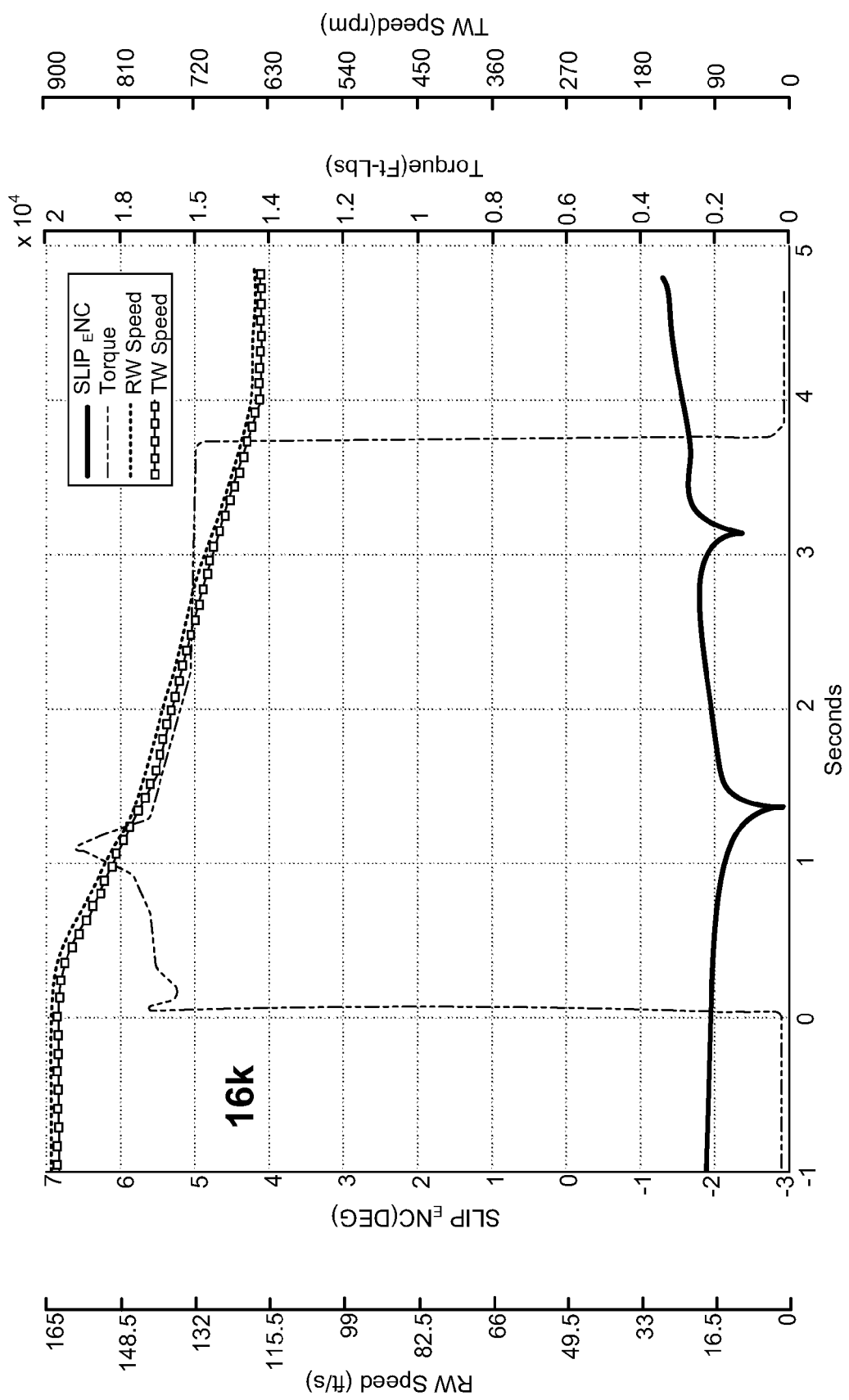
FIGS. 4-21 illustrate various performance results of various embodiments.
Figure 5:
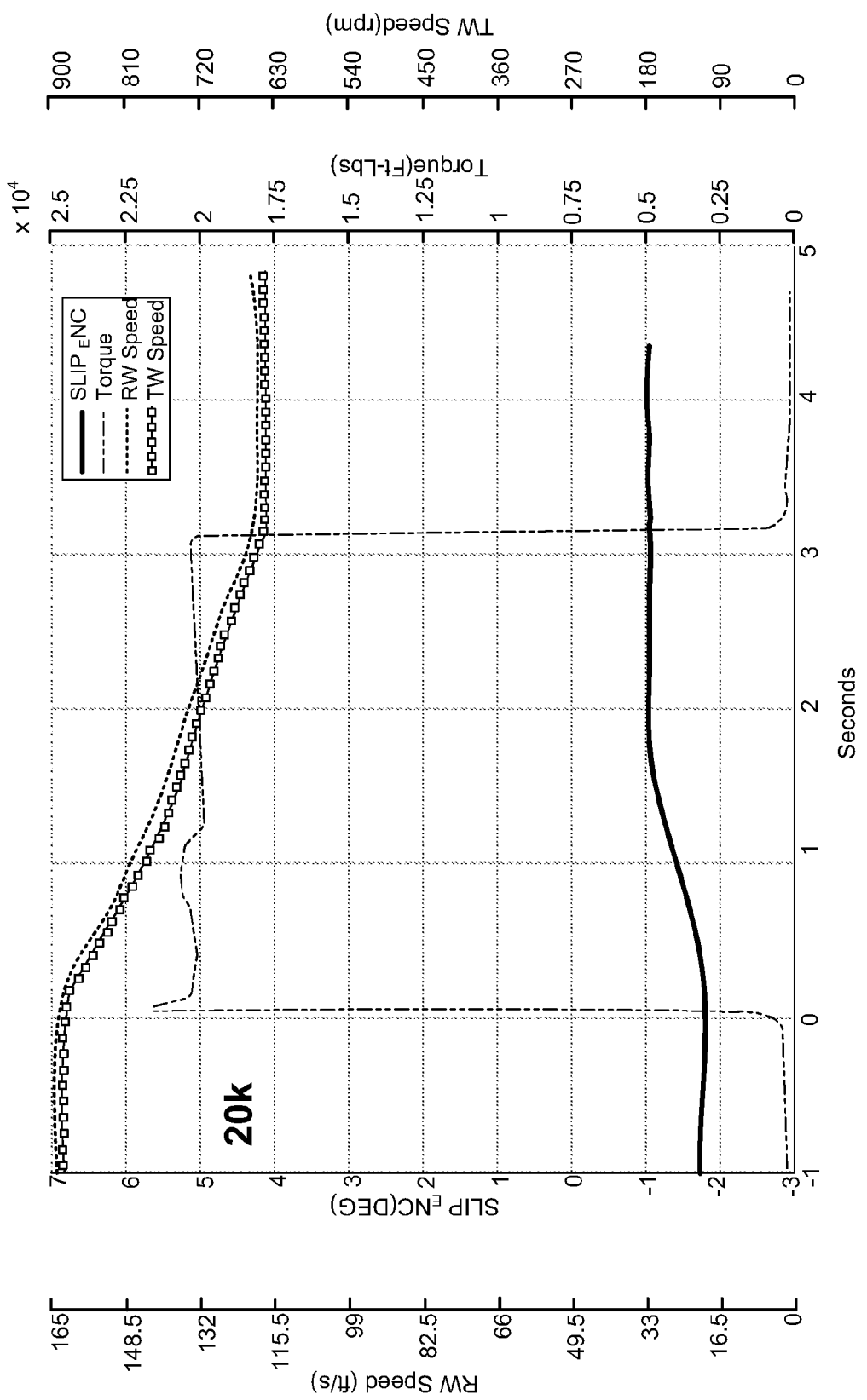
Figure 6:
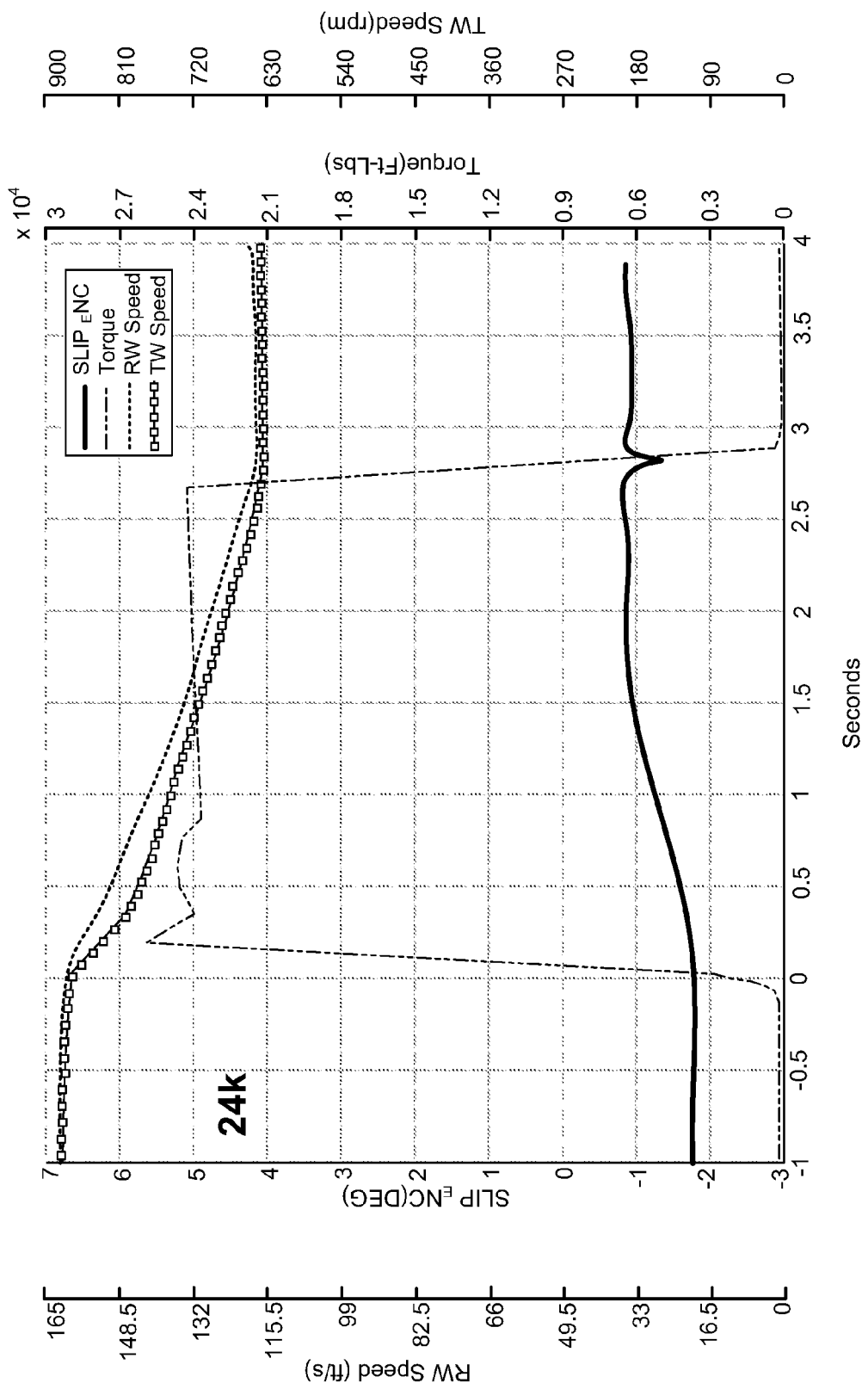
Figure 7:
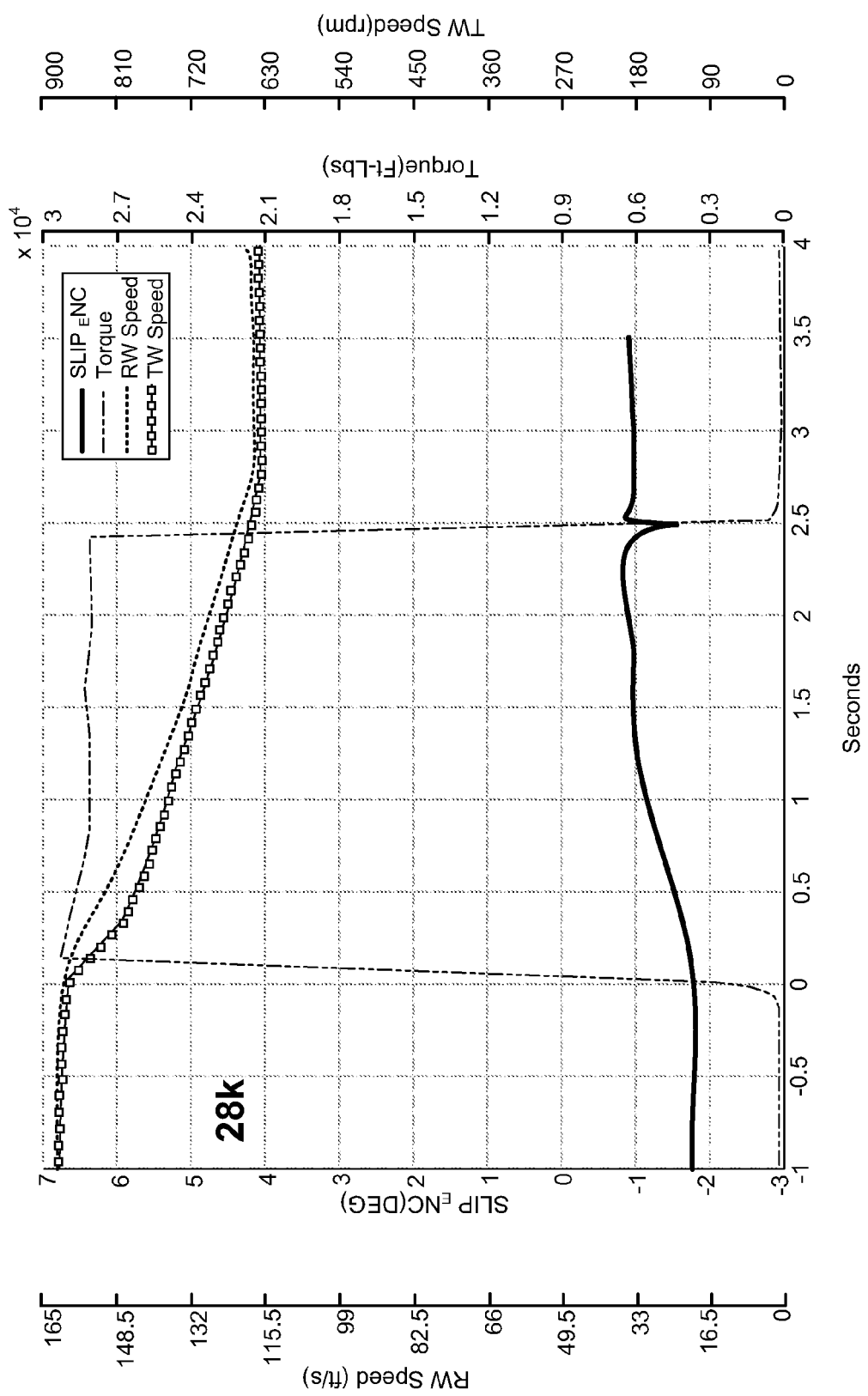
Figure 8:
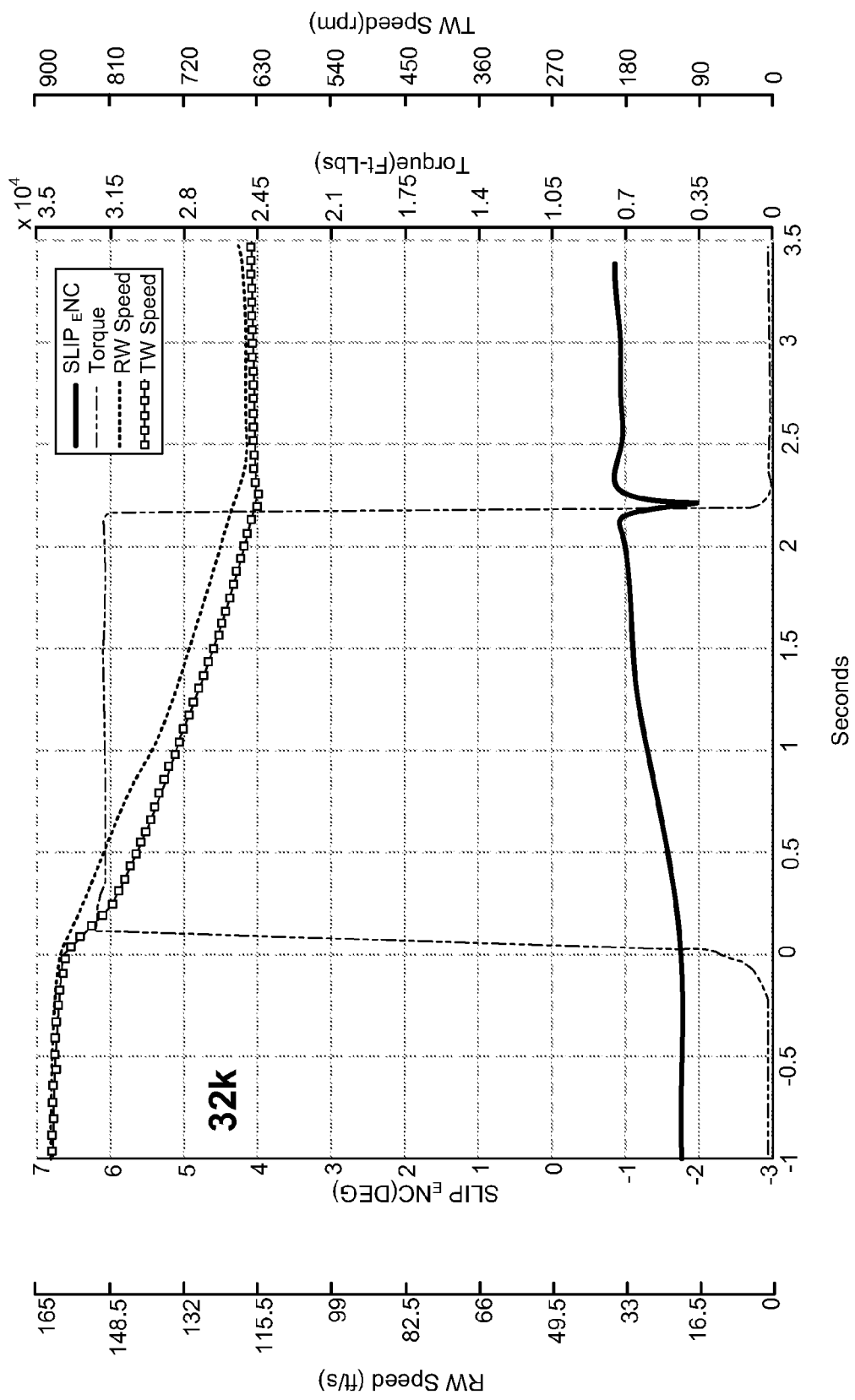
Figure 9:
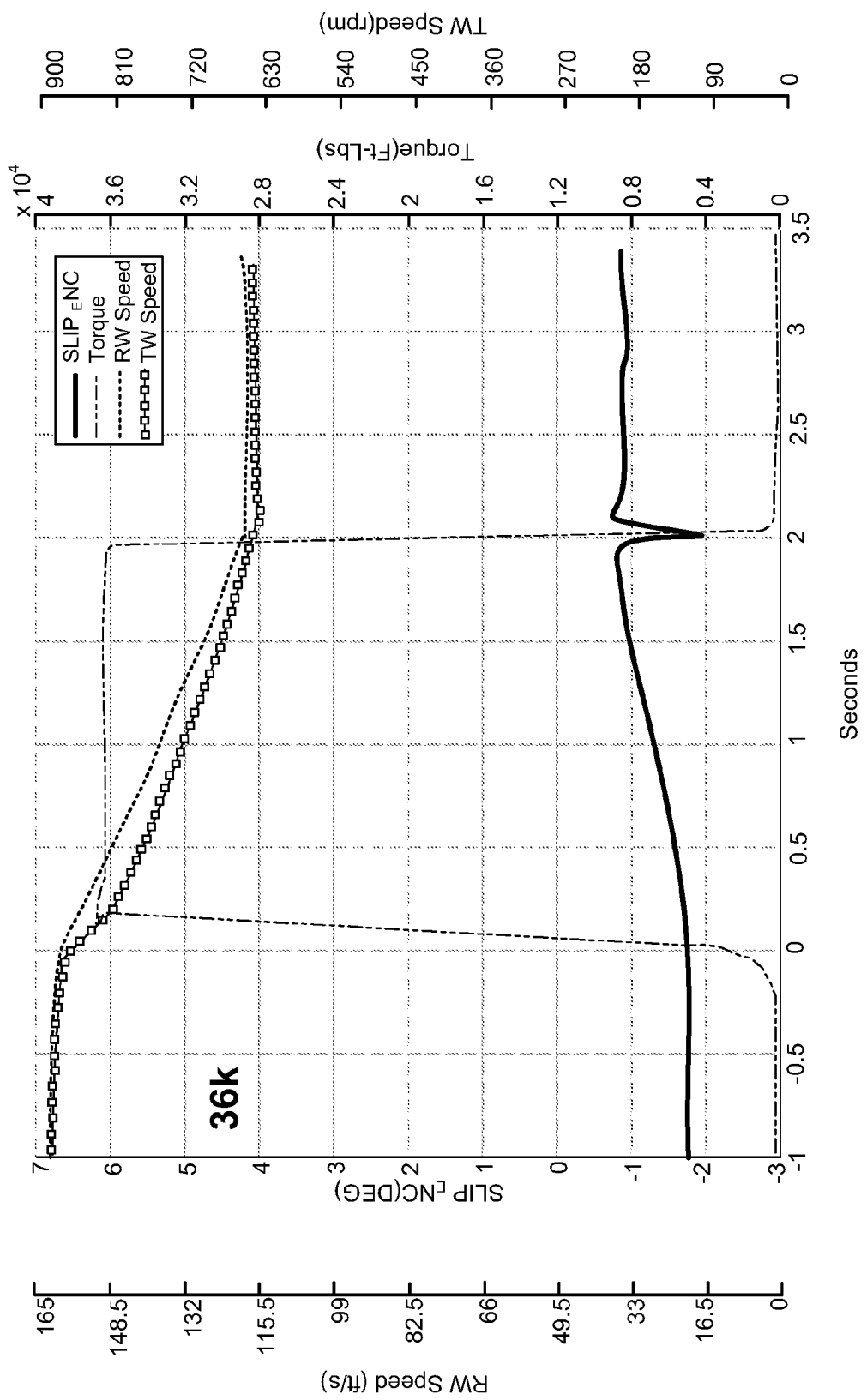
Figure 10:
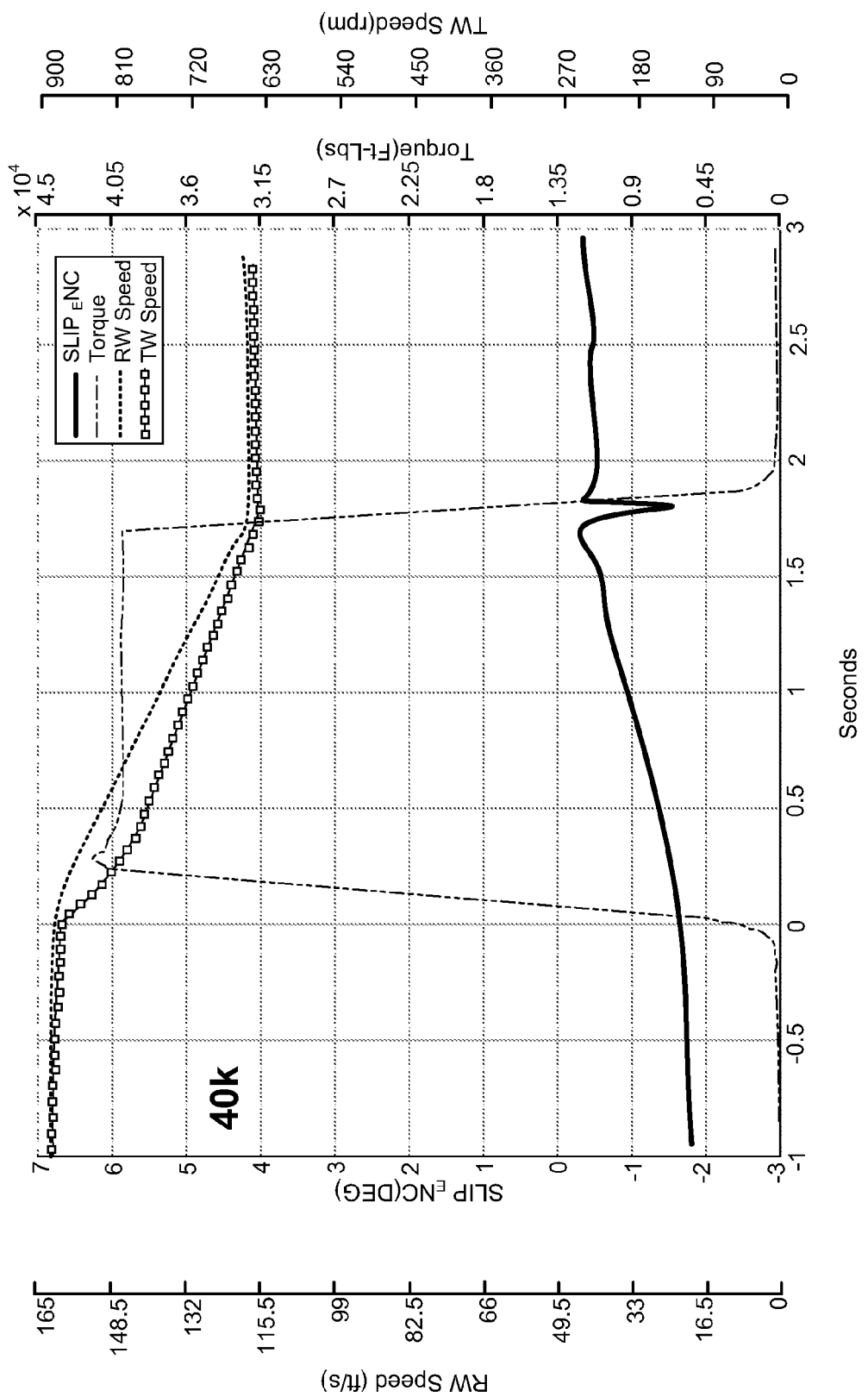
Figure 11:
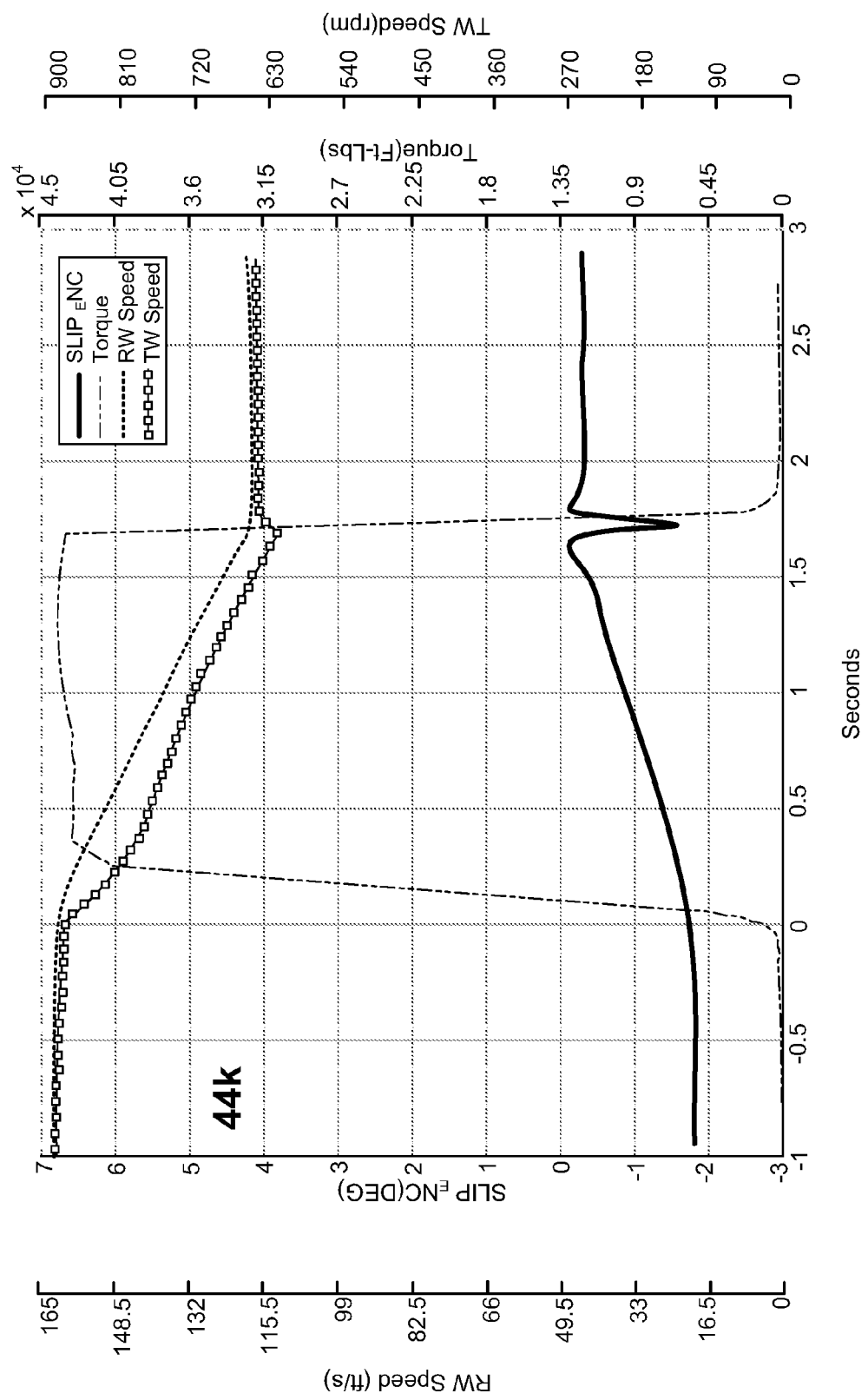
Figure 12:
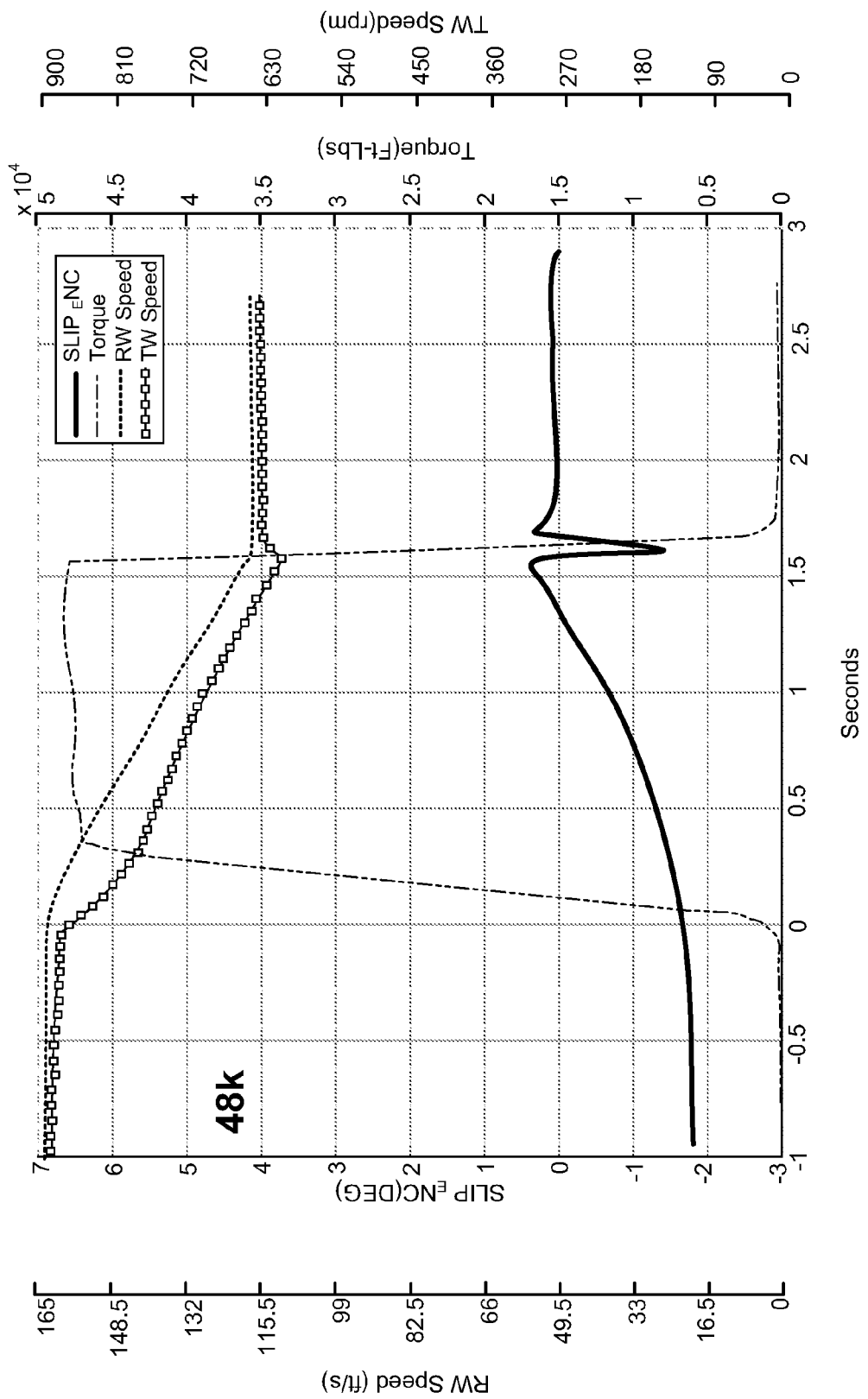
Figure 13:
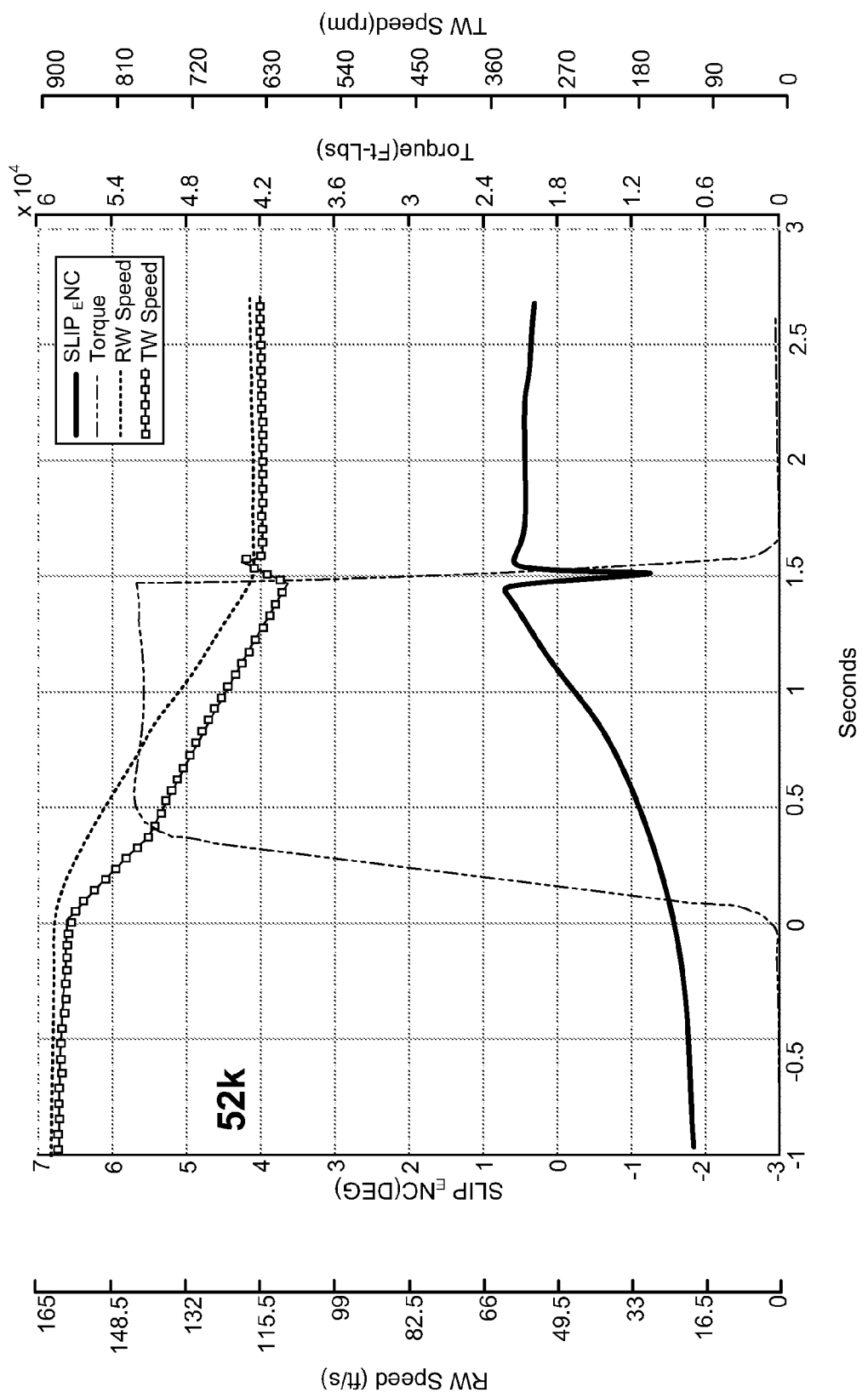
Figure 14:
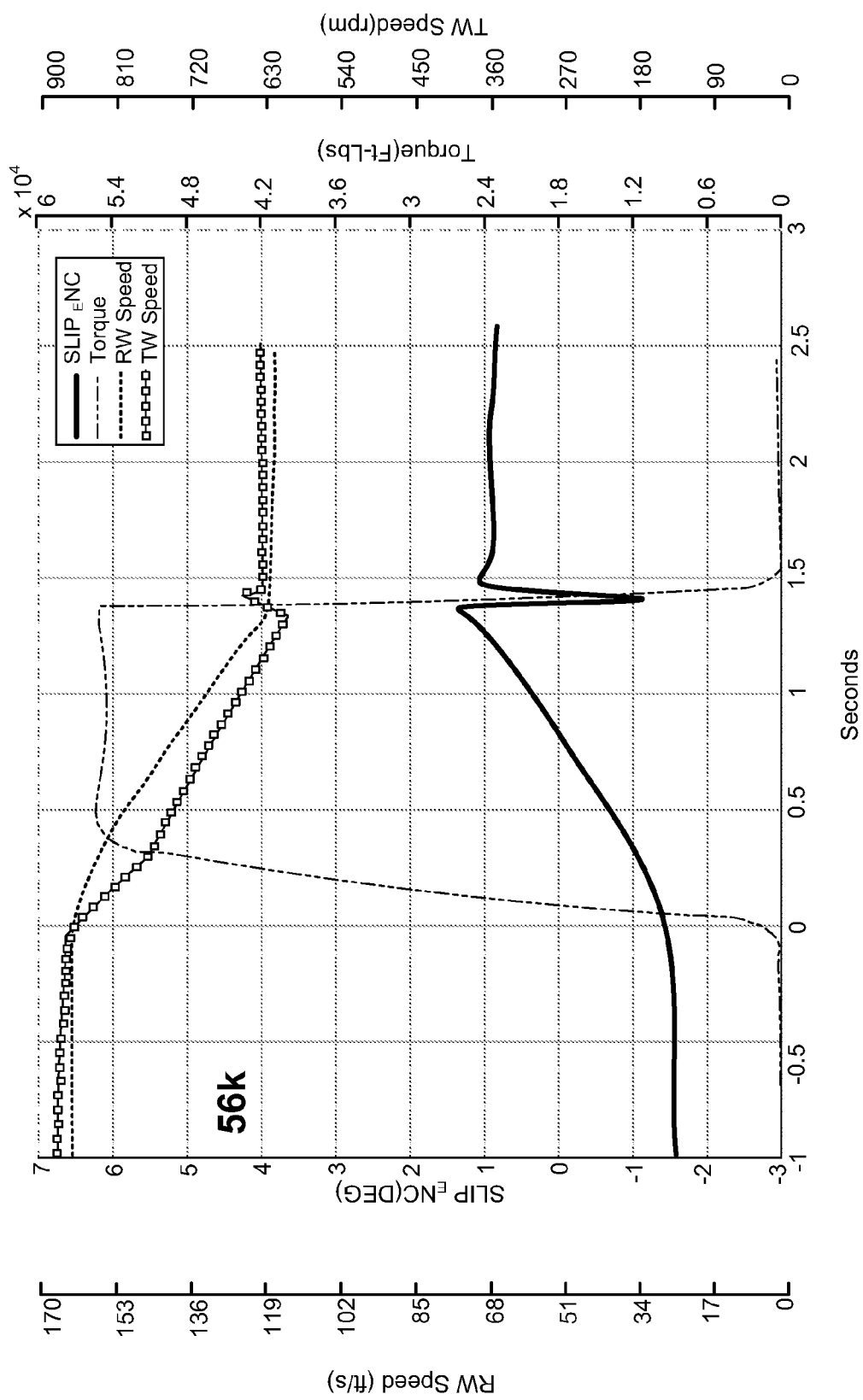
Figure 15:
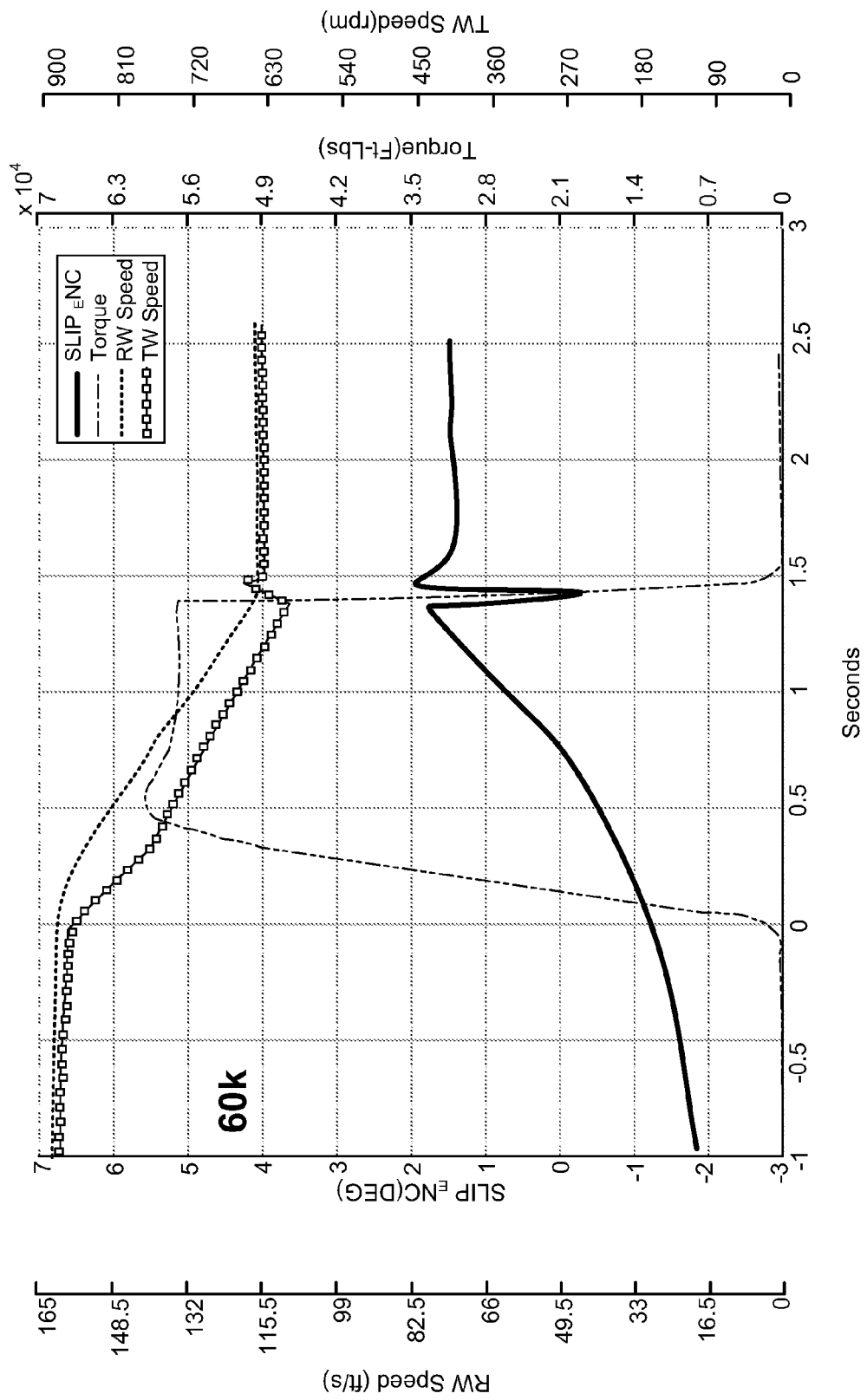
Figure 16:
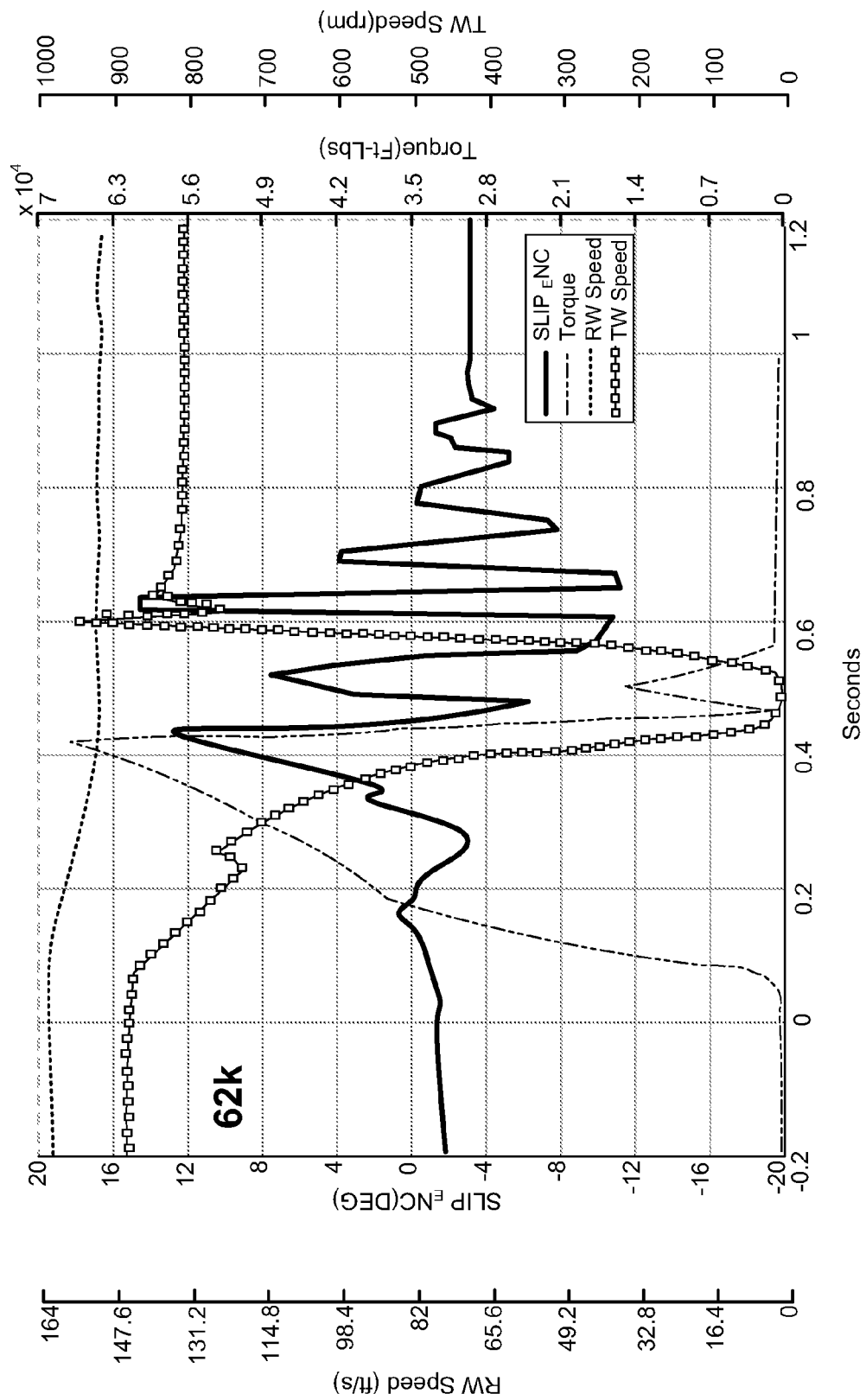

OD lock ring 106 and ID lock ring 202 both have a "V" configuration, though other configurations are contemplated herein. In various embodiments, a "V" configuration may comprise any lock ring having two portions disposed at an angle from about 0 degrees to about 179 degrees, more preferably from about 10 degrees to about 120 degrees, and more preferably from about 30 degrees to about 100 degrees. A "V" configuration may comprise two top points and a bottom point, just as a "V" has a bottom point where two lines converge at an angle. The other termini of the two lines may be referred to as the two top points. In various embodiments having an OD lock ring and an ID lock ring having "V" configurations, an OD lock ring bottom point is adjacent to at least one of the two ID lock ring top points. For example, FIG. 3 illustrates a top point of ID lock ring 202 at point 306 adjacent to the bottom point of OD lock ring 106 at point 310. As used herein, the term adjacent may mean in close proximity to, but does not necessarily require contact.

With reference to FIG. 2, ID lock ring 202 has two points (e.g., points 206 and 208) that provide surface contact between ID lock ring 202 and wheel base 102. ID lock ring 202 has one point (e.g., point 204) that provides a surface contact between ID lock ring 202 and side rim 104. Points 204, 206, and 208 thus comprise a torque path that transfers torque from wheel base 102 to side rim 104. OD lock ring 106 has two points (e.g., points 210 and 220) that provide a surface contact between OD lock ring 106 and side rim 104. OD lock ring 106 has one point (e.g., point 218) that provides a surface contact between OD lock ring 106 and wheel base 102. Points 210, 220, and 218 thus comprise a torque path that transfers torque from wheel base 102 to side rim 104. As described above, the torque path defined by points 204, 206, and 208 and the torque path defined by points 210, 220, and 218 may reduce the tendency for a wheel skid to occur.

In addition, while not intending to be bound by theory, it is believed that a lock ring that has a different frictional potential between the lock ring and two adjacent structures may improve the lock ring's ability to transmit torque while reducing the likelihood of wheel skids. Stated another way, in accordance with various embodiments, a lock ring may have a greater frictional potential between the lock ring and a wheel base than the frictional potential between the lock ring and a side rim. The structure that has a greater frictional potential with a lock ring may be referred to as the lock ring's "preferred mating member." For example, a wheel base may be referred to as a lock ring's preferred mating member when the lock ring has a greater frictional potential between the lock ring and the wheel base than the frictional potential between the lock ring and the side rim.

For example, ID lock ring 202 may have a greater frictional potential between wheel base 102 than between side rim 104. Similarly, OD lock ring 106 may have a greater frictional potential between side rim 104 than between wheel base 102. In such embodiments, ID lock ring 202's preferred mating member is wheel base 102 and OD lock ring 106's preferred mating member is side rim 104. Frictional potential may be controlled by the size and nature of the surface contact between a lock ring and a wheel base or side rim. In addition, the frictional potential between a lock ring and a wheel base or side rim may be controlled by selection of surface coatings or other characteristics of the lock ring.

With momentary reference to FIG. 3, wheel assembly 300 is shown. Wheel assembly 300 is a different perspective of wheel assembly 200. Points 302, 304 and 306 define a torque path for ID lock ring 202, while points 308, 310 and 312 define a torque path for OD lock ring 106. Multiple torque paths (such as that shown in FIG. 3) may increase the torque capacity of the lock ring assembly.

OD lock ring 106 and ID lock ring 202 may comprise any suitable material. For example, an OD lock ring and/or an ID lock ring (e.g., OD lock ring 106 and ID lock ring 202) may be comprised of an aluminum alloy such as 2024 (extruded), 7075 (extruded), 2024 (plate), 7075 (plate), and/or 4026. Both 2024 and 7075 may be produced by extrusion. It should be noted that any temper of an aluminum alloy is contemplated herein, such as 2024T3 (extruded) and 7075T6 (extruded). An OD lock ring and/or an ID lock ring may also be comprised of steel and/or a poly matrix composite (PMC).

OD lock ring 106 and ID lock ring 202 may be mechanically treated. For example, OD lock ring 106 and ID lock ring 202 may be treated by shot peening. Shot peening may comprise the forceful application of shot (e.g., beads or pellets) against a substrate (e.g., a lock ring). Also for example, OD lock ring 106 and ID lock ring 202 may be treated by roller burnishing.

OD lock ring 106 and ID lock ring 202 may comprise a surface coating. For example, OD lock ring 106 and ID lock ring 202 may be coated with polytetrafluoroethylene (TEFLON) and/or molybdenum disulfide. Moreover, OD lock ring 106 and ID lock ring 202 may be anodized (e.g., using sulfuric acid). Surface coatings may be selected based upon cost, durability, frictional characteristics, and other like considerations.

In various embodiments, an OD lock ring and/or an ID lock ring may be nondeformable or minimally deformable. As used herein, nondeformable or minimally deformable may refer to a material that is nondeformable or minimally deformable to a degree where measurement of deformity is difficult under the range of expected operating forces in a wheel assembly. For example, a nondeformable or minimally deformable material may be a material that is nondeformable or minimally deformable under the forces exerted by an inflated tire and/or the weight of an aircraft. Further, a nondeformable or minimally deformable lock ring may be nondeformable or minimally deformable material about a cross section under the forces typically exerted by an inflated tire and/or the weight of an aircraft. A lock ring made from a nondeformable or minimally deformable material may be made to become more deformable through the application of particular geometric cross sections. Stated another way, a lock ring made from a nondeformable or minimally deformable material may be made to exhibit certain characteristics of a deformable material by selection of geometric cross sections that are amenable to deformation under the forces typically exerted by an inflated tire and/or the weight of an aircraft.

However, in various embodiments, an OD lock ring and/or an ID lock ring may be comprised of a deformable material such as aluminum alloys 2024 and 7075. As used herein, a deformable material may refer to a material that deforms to a measurable degree under the forces exerted by an inflated tire and/or the weight of an aircraft. Moreover, a deformable material may be deformable across a particular geometric configuration. For example, in various embodiments, a lock ring having a "V" configuration may be deformable about its cross section. Thus, a lock ring having a "V" configuration that is comprised of a deformable material may have an altered angle when placed under the forces exerted by an inflated tire and/or the weight of an aircraft. An inflated tire introduces a normal force (e.g., in line with radius 110) on side rim 104. This normal force may deform OD lock ring 106 and ID lock ring 202 in a radial direction. In addition, an inflated tire may introduce an axial force on side rim 104, which may deform OD lock ring 106 and ID lock ring 202 in an axial direction. For example, a "V" configured lock ring may have an angle of 100 degrees, but that angle may increase to 105 degrees after tire inflation due to the force exerted on the lock ring from a side rim. Lock rings that are deformable about their cross section may be beneficial in that they need not be machined "perfectly" in order to function as intended. Stated another way, such lock rings conform to one another and to the wheel assembly in which they are used, reducing the need for precise or accurate machining.

OD lock ring 106 and ID lock ring 202 may be in contact at interface 216. Interface 216 may comprise the interface of a surface of OD lock ring 106 and a surface of ID lock ring 202. The frictional characteristics of interface 216 may be influenced by any surface coating that may be disposed on one or more of OD lock ring 106 and ID lock ring 202, if any such surface coating is present in various embodiments. During braking, OD lock ring 106 and ID lock ring 202 may be stationary relative to each other along interface 216. During braking under conditions that tend to cause a wheel skid (e.g., during a high rate of torque change), OD lock ring 106 and ID lock ring 202 may slip relative to each other along interface 216. Such slipping may provide a dampening effect that tends to prevent or reduce a wheel skid.

FIGS. 4-21 illustrate various performance results of various embodiments. In particular, tests are performed with a wheel assembly having a lock ring assembly having two deformable lock rings in a "V" configuration. The lock ring assemblies have an interface about which they may slip relative to each other. Stated another way, the tests embodiment is in accordance with FIG. 1-3, as described above. As shown in FIGS. 4-21 and described below, the tested embodiment tends to resist wheel skid. In other words, slip between the side rim and wheel base is minimized.

Figure 17:
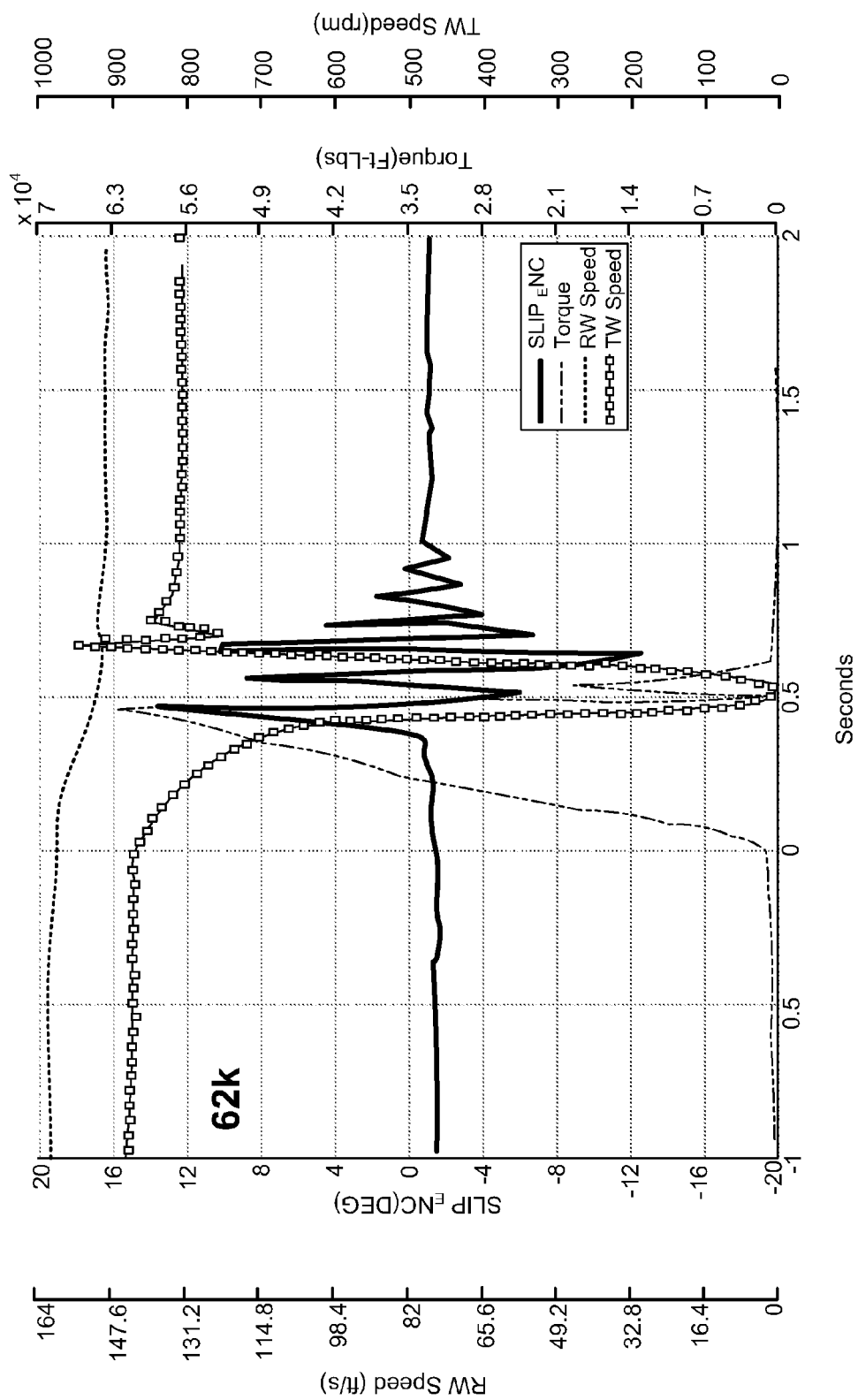

For example, in FIGS. 4-17, various torque levels are applied to the test wheel assembly. In these tests, a test wheel assembly is spun to a given speed and then torque is applied. The x axis illustrates time in second. With reference to the key in each of FIGS. 4-17, torque applied is shown along the y axis as a "dash dot dot" line. "SLIP$_E$NC" depicts the slip between the side rim and the wheel base and is shown as a solid black line. "RW Speed" depicts the simulated landing speed (i.e., the land speed of the aircraft) and is shown as a small dotted line. "TW Speed" depicts the test wheel speed and is shown as a line of small squares. Each of FIGS. 4-16 indicate the total torque applied, starting from 16,000 ("16 k") foot-lbs in FIG. 4 to 62,000 ("62 k") foot-lbs in FIG. 16, with each figure incrementing the torque applied by 4,000 foot-lbs. FIG. 17. illustrates an additional test at 62,000 ("62 k") foot-lbs.

Figure 18:
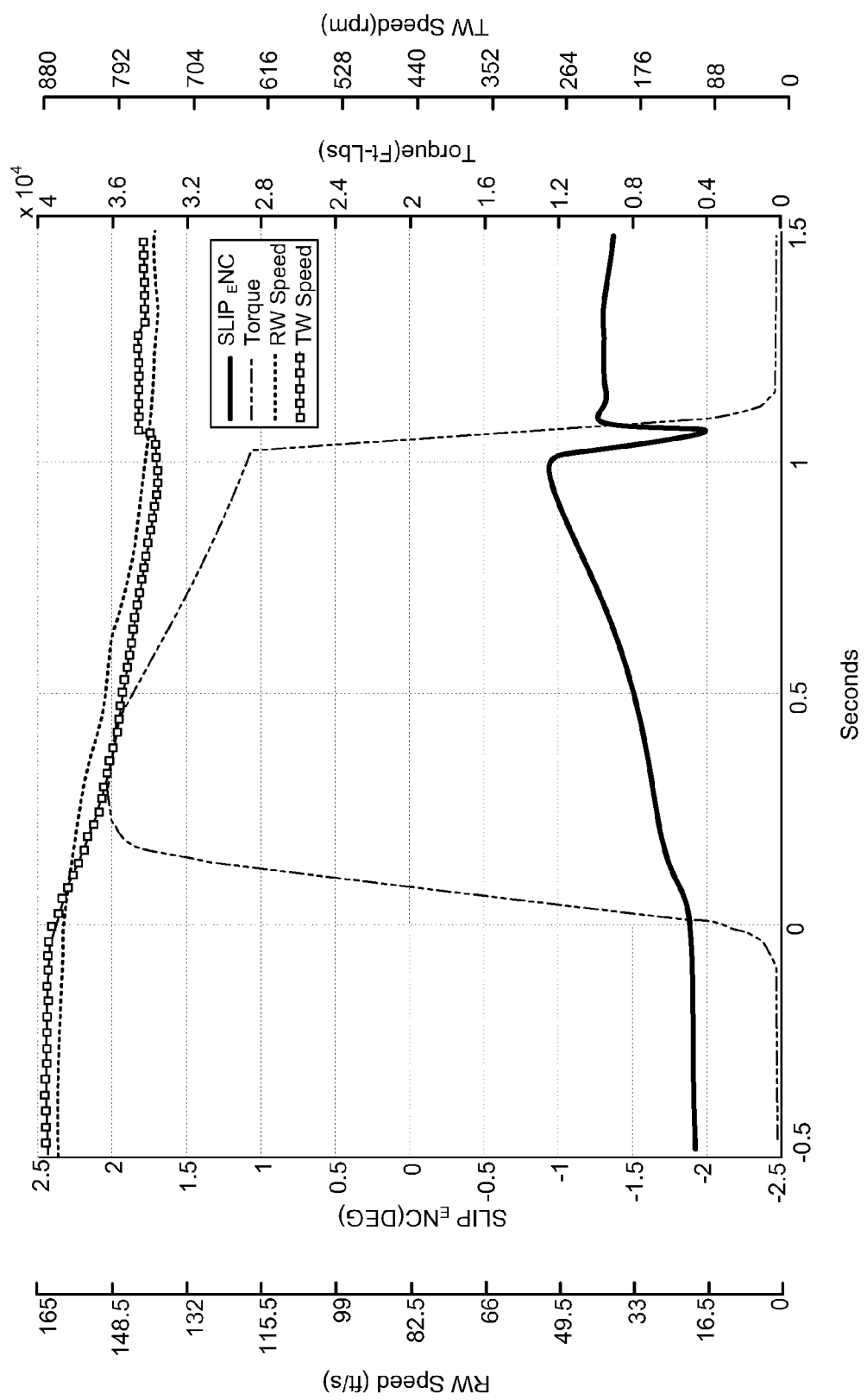
Figure 19:
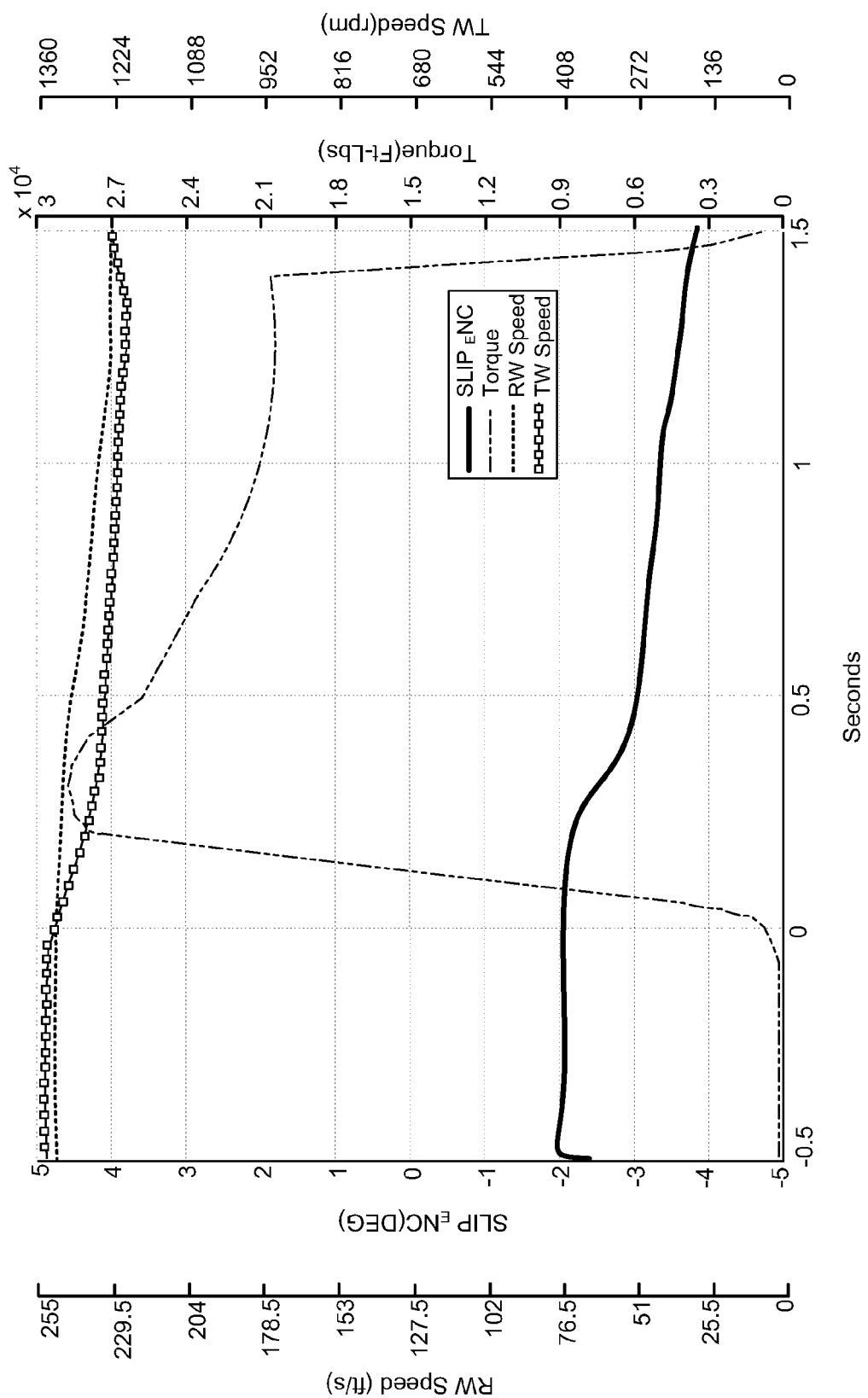
Figure 20:
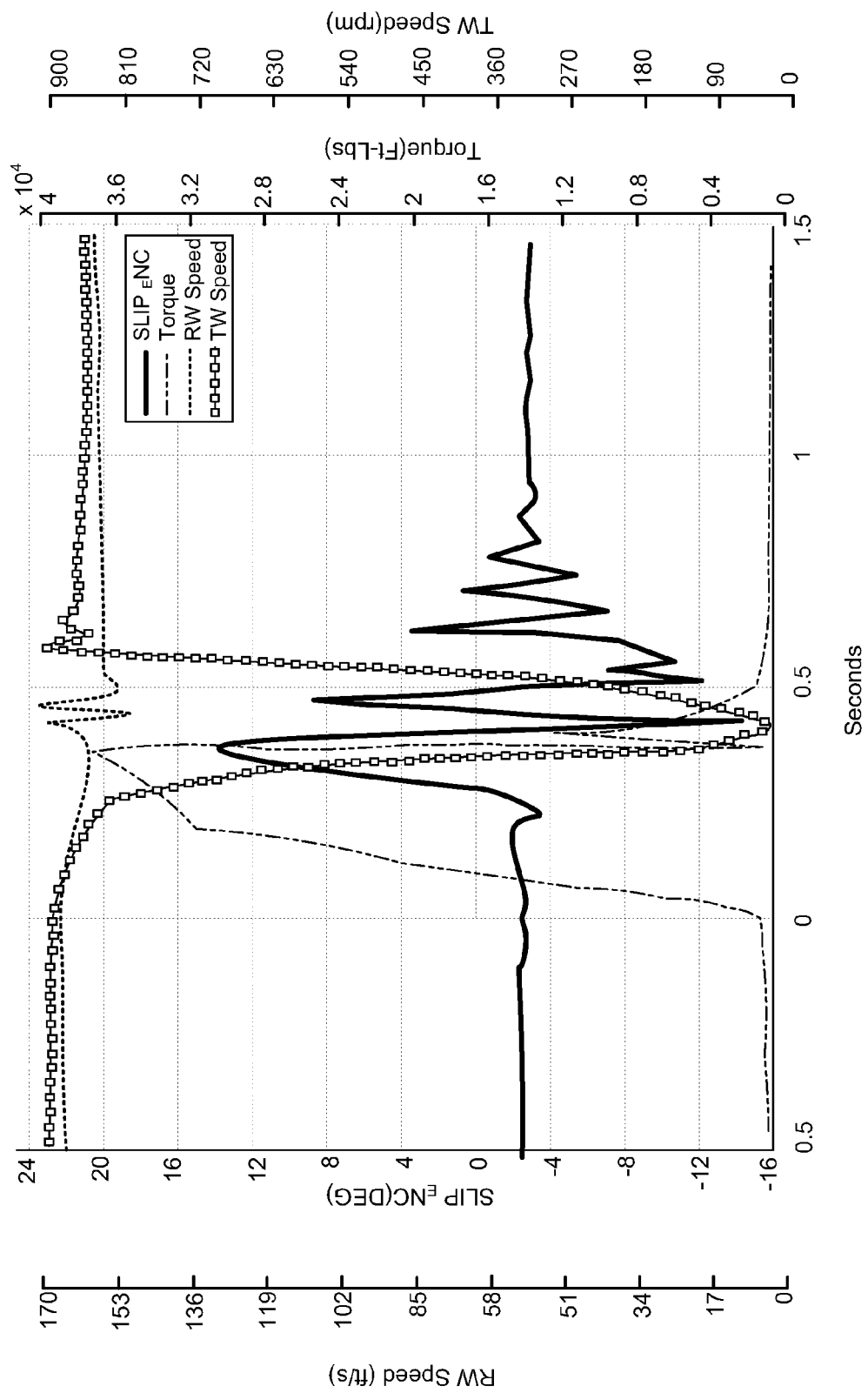
Figure 21:
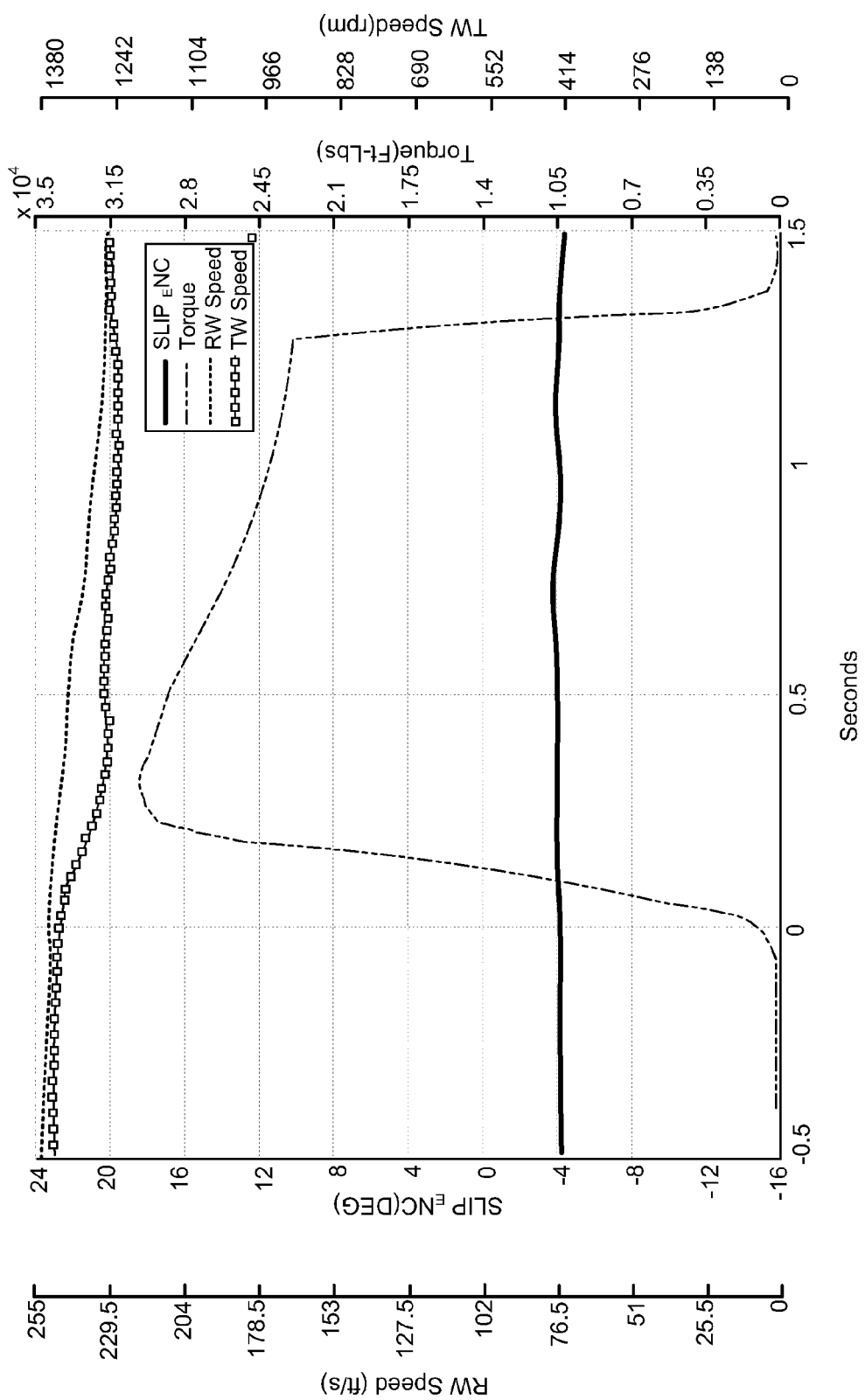

FIGS. 18-21 illustrate various performance results of various embodiments under various tire pressure scenarios. As descried above, an inflated tire exerts both radial and axial forces on the side rim. Thus, testing during loss or partial loss of tire pressure may be helpful. FIG. 18 depicts a test of stopping at 160 ft/s with a tire pressure of 215 psig. FIG. 19 depicts a test of stopping at 250 ft/s with a tire pressure of 215 psig. FIG. 20 depicts a test of stopping at 160 ft/s with a tire pressure of 149 psig. FIG. 21 depicts a test of stopping at 250 ft/s with a tire pressure of 149 psig.

Figure 22:
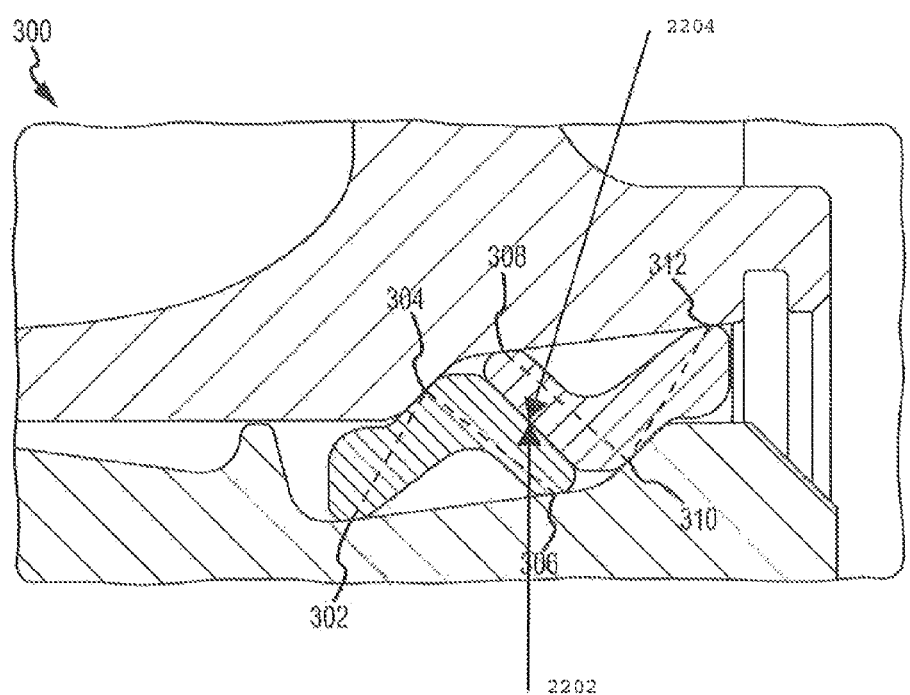
FIG. 22 illustrates a different view of the cross section of the wheel assembly of FIG. 2, in accordance with various embodiments.

FIG. 22 illustrates a different view of the cross section of the wheel assembly of FIG. 2, in accordance with various embodiments. FIG. 22 illustrates coatings 2202 and 2204 on OD lock ring 106 and ID lock ring 202.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wheel assembly comprising:
a wheel base having a side rim disposed about a circumference of the wheel base;
a first lock ring and a second lock ring disposed within a gap between the wheel base and the side rim, wherein the first lock ring is disposed axially inward, with respect to the wheel base, of the second lock ring;
wherein the wheel base is a preferred mating member of the first lock ring, and
wherein the side rim is a preferred mating member of the second lock ring.

2. The wheel assembly of claim 1, wherein the first lock ring and the second lock ring are in contact.

3. The wheel assembly of claim 1, wherein the first lock ring and the second lock ring have a "V" configuration.

4. The wheel assembly of claim 1, wherein the first lock ring and the second lock ring are comprised of a deformable material.

5. The wheel assembly of claim 1, wherein the first lock ring and the second lock ring are comprised of a material comprising at least one of steel, a poly matrix composite and an aluminum alloy.

6. The wheel assembly of claim 1, wherein at least one of the first lock ring and the second lock ring are coated with a surface coating.

7. The wheel assembly of claim 1, wherein the first lock ring has two surface contacts with the wheel base and one surface contact with the side rim, and wherein the second lock ring has two surface contacts with the side rim and one surface contact with the wheel base.

* * * * *